Figure 3:
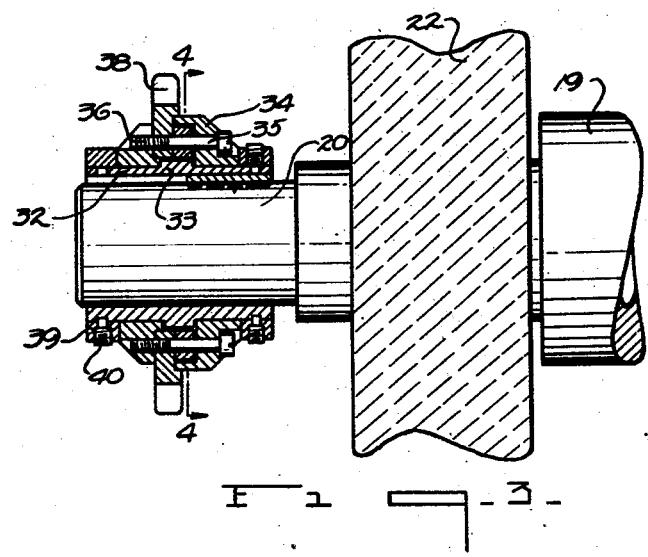

Sept. 1, 1931. C. CONE 1,821,617
APPARATUS FOR FORMING AND ANNEALING SHEET GLASS
Filed Oct. 17, 1929 2 Sheets-Sheet 1
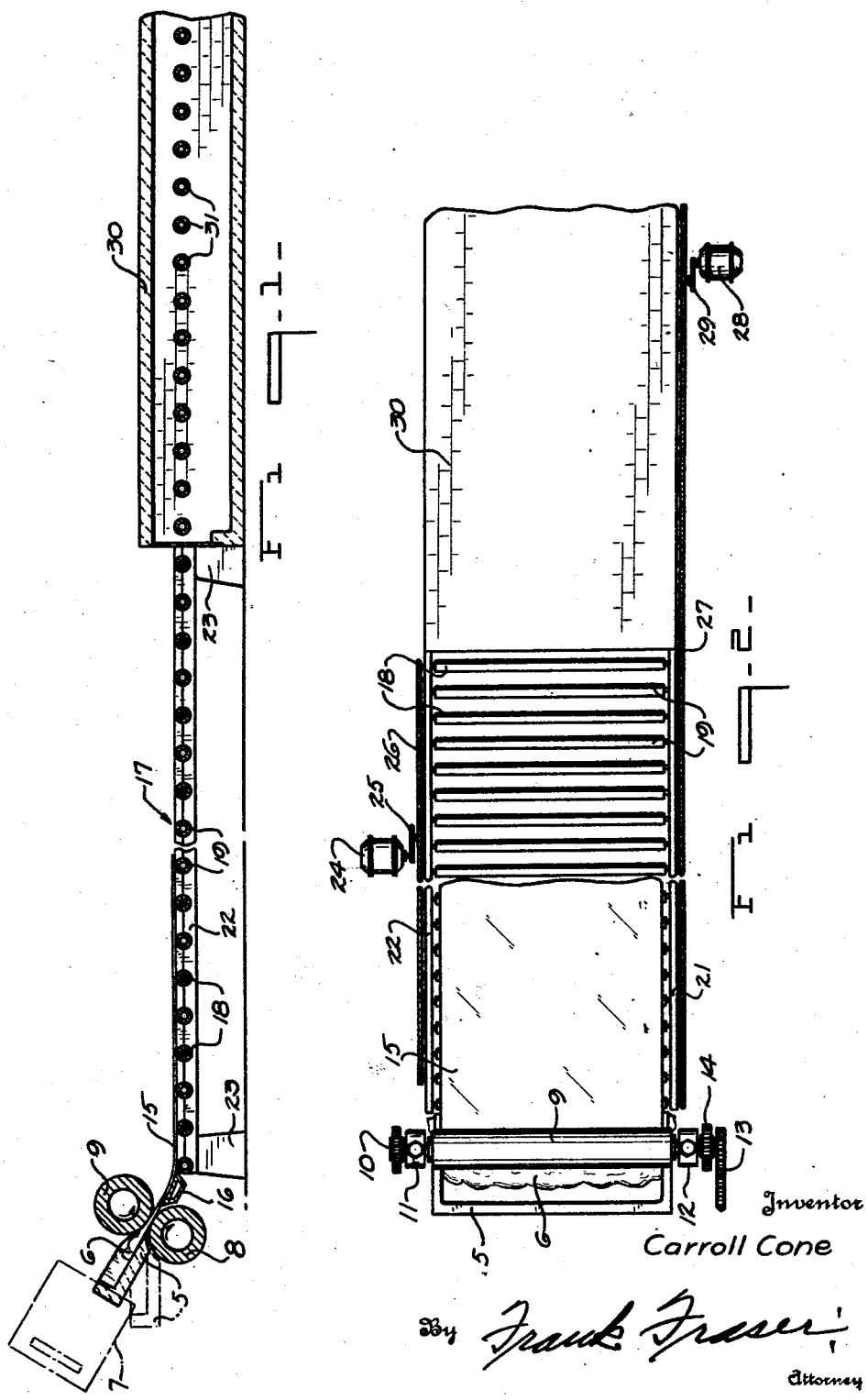
Inventor
Carroll Cone
By Frank Fraser
Attorney Sept. 1, 1931.   C. CONE   1,821,617
APPARATUS FOR FORMING AND ANNEALING SHEET GLASS
Filed Oct. 17, 1929   2 Sheets-Sheet 2

Inventor
Carroll Cone
By Frank Fraser
Attorney

Patented Sept. 1, 1931

1,821,617

UNITED STATES PATENT OFFICE

CARROLL CONE, OF TOLEDO, OHIO, ASSIGNOR TO LIBBEY-OWENS-FORD GLASS COMPANY, OF TOLEDO, OHIO, A CORPORATION OF OHIO

APPARATUS FOR FORMING AND ANNEALING SHEET GLASS

Application filed October 17, 1929. Serial No. 400,394.

This invention relates to improvements in apparatus for the manufacture of sheet or plate glass.

The present invention is particularly designed for the production of successive sheets of glass by an intermittent casting and rolling operation and for rendering possible the formation of the sheets at a relatively high speed and their subsequent annealing at a relatively slower speed while, at the same time, maintaining the sheets in constant motion so as to prevent sagging of said sheets and thereby improve the quality and flatness thereof.

According to the invention, a mass or charge of molten glass is preferably melted and refined within a suitable receptacle or pot and then poured therefrom onto a receiver from where it is moved to and passed between a pair of forming rolls which serve to reduce the glass to a sheet of substantially predetermined and uniform thickness. The sheet is adapted to be formed at a relatively high rate of speed after which its speed of travel is reduced and it is annealed while traveling at such reduced speed. The rapid reduction of the molten glass to sheet form is desirable for the reason that the glass will not become unduly chilled before it is formed into a sheet and further, because the contact of the glass with the relatively cool forming rolls will be relatively short so that the surfaces of the glass sheet will not be unduly marred. Also, by rolling the glass to sheet form at a relatively high rate of speed, production can be accelerated. On the other hand, by rendering possible a reduction in the speed of travel of the sheet and causing it to be annealed while traveling at a speed less than its speed of formation, the length of leer used may be materially decreased.

An important object of the invention is to provide novel and improved apparatus of a simple yet efficient and practical nature whereby the speed of travel of the sheet will be reduced from its relatively high forming speed to a relatively slower annealing speed in an easy and convenient manner and without the use of complicated speed changing mechanism.

Another object of the invention is the provision of apparatus of the above character including a conveyor table for receiving the sheet as it issues at a relatively high rate of speed from the forming mechanism, said table being composed of alternately arranged high and low speed rolls, the sheet causing the low speed rolls to overrun as it passes onto the table after which the high speed rolls are slowed down to allow the speed of travel of the sheet to be gradually lowered to the speed of the low speed rolls which then function to feed the sheet into an annealing leer wherein it is annealed while being carried therethrough at a constant speed relatively less than its speed of formation.

Other objects and advantages of the invention will become more apparent during the course of the following description when taken in connection with the accompanying drawings.

Figure 4:
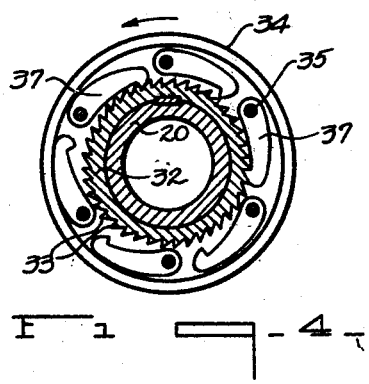

In the drawings forming a part of this application and wherein like numerals are employed to designate like parts throughout the same, Fig. 1 is a vertical longitudinal section through apparatus provided by the present invention, showing the forward end portion of the annealing leer, Fig. 2 is a plan view thereof, Fig. 3 is a sectional detail view of a portion of the apparatus showing the overrunning clutch for the rolls, and Fig. 4 is a section taken substantially on line 4—4 of Fig. 3.

Referring to the drawings, 5 designates a receiver or support adapted to receive thereupon a mass or charge of molten glass 6 from a pot or other suitable receptacle 7. The mass of molten glass 6 is preferably supplied to the receiver when the same is in a substantially horizontal position as indicated by the broken lines in Fig. 1, after which the pot 7 is removed and the receiver tilted upwardly to cause the molten glass to move downwardly between a pair of forming rolls 8 and 9. The forming rolls are spaced from one another to create a sheet forming pass therebetween and are mounted upon shafts 10 rotatably supported at their opposite ends within members 11 and 12.

As pointed out above it is desirable that the molten glass 6 be rapidly reduced to sheet form and the forming rolls 8 and 9 are consequently driven at a relatively high peripheral speed so that they will function to rapidly reduce the mass of molten glass to sheet form. One of the forming rolls may be positively driven by suitable driving means 13 and the other roll driven from the first roll through intermeshing gears 14 mounted upon the roll shafts 10.

The forming rolls 8 and 9 are adapted to reduce the charge of molten glass 6 to a sheet 15 of substantially predetermined and uniform thickness, the said sheet being supported as it leaves the forming rolls upon an inclined runway or chute 16. Positioned adjacent the chute 16 and adapted to receive the glass sheet 15 therefrom is a horizontal receiving or conveyor table designated in its entirety by the numeral 17 and being preferably composed of a plurality of high speed rolls 18 and a plurality of low speed rolls 19, each of the rolls 18 and 19 being mounted upon a shaft 20 (Fig. 3) journaled at its opposite ends in the side frames 21 and 22 supported at their opposite ends upon standards 23.

The high speed rolls 18 and the low speed rolls 19 are arranged alternately with one another as shown in Fig. 1 and for the purposes of illustration in order to differentiate between these two sets of rolls, it will be noted that the centers of the high speed rolls 18 are in section while the centers of the low speed rolls 19 are not. The high speed rolls 18 are driven in unison in any suitable manner such as from a motor 24 driving through the reduction gearing 25 a sprocket chain 26 associated with the roll shafts. The low speed rolls are adapted to be similarly driven by a separate sprocket chain 27 from a motor 28 through reduction gearing 29.

Arranged at the end of the conveyor table 17 is an annealing leer 30 having mounted therein a series of rolls 31 and in horizontal alignment with the rolls 18 and 19 of conveyor table 17. While the leer rolls may be driven from a separate drive, it will be noted upon reference to Fig. 2 that the leer rolls are herein shown as being driven from the drive for the low speed rolls 19.

According to the invention, each of the rolls 18 and 19 are free to overrun so that while they are positively driven at one speed they may be rotated by the sheet passing thereover at a greater speed and thereby overrun their driving means. This may be accomplished in any desired manner such as by the provision of overrunning clutches as illustrated in Figs. 3 and 4. The overrunning clutch comprises a sleeve 32 keyed to the shaft 20 of the corresponding roll 18 or 19, the sleeve 32 being provided with ratchet teeth 33. Encircling the sleeve 32 is a ring 34 through which extend a plurality of pivot pins 35 screw threaded at one end as at 36 to prevent accidental displacement thereof. The pins 35 are adapted to carry pawls 37 and also a sprocket wheel 38. The ring member 39 and set screws 40 are designed to prevent accidental displacement of the ring 34 and associated parts. The sprocket wheel 38 has trained thereover either the sprocket chain 26 or 27 which drives the rolls in the direction indicated by the arrow in Fig. 4. Normally, the pawls 37 engage the teeth 33 on sleeve 32 to positively drive the rolls. In the event, however, that the linear speed of the glass sheet 15 exceeds the peripheral speed of the rolls, due to frictional contact between the sheet and rolls the sheet is allowed to drive the rolls faster than they are positively driven. When this occurs, the pawls 37 simply ride freely over the teeth 33 upon rotation of the sleeve 32.

During the formation of the sheet, it is preferred that the low speed rolls 19 be positively driven at a relatively slow speed or, in other words, at the speed at which the sheet is adapted to be annealed and which may be for example in the neighborhood of five feet per minute. The sheet is preferably rolled at a relatively high rate of speed such as for example sixty feet per minute, and during the rolling of the sheet, the high speed rolls 18 are positively driven at this high speed or, in other words, at a speed substantially equal to the speed of sheet formation. As the sheet is rolled out onto the conveyor table 17, it will be carried forwardly by the high speed rolls at its speed of formation and due to the provision of the overrunning clutches, the low speed rolls will be permitted to overrun and thereby synchronize with the high speed rolls. Thus, as the sheet is rolled at high speed, it will overrun the slow speed rolls. After the entire sheet has been deposited upon the conveyor table 17, however, the motor 24 driving high speed rolls is stopped and the high speed rolls are then permitted to overrun. When this is done, the sheet will gradually lose its speed or, in other words, the high speed rolls and the low speed rolls will gradually slow down as there will be no positive driving force acting upon them, and as the rolls slow down, naturally the sheet will likewise be slowed down. When the rolls and sheet have slowed down to the proper annealing speed, the driving means for the low speed rolls will cause the same to be positively driven at the slow annealing speed of approximately five feet per minute to transfer the sheet at such slow speed into the annealing leer through which it is carried at this low speed. Thus, there is provided a simple yet efficient and practical means for changing the speed of travel of the sheet from its relatively high forming speed to its relatively slow annealing speed. By the provision of the present improved apparatus, it is possible to attain those advantages incident to the rapid reduction of the molten glass to sheet form and also those advantages which result from slower annealing of the glass.

If desired, only the low speed rolls need be provided with overrunning clutches. With such an arrangement, after the sheet has been entirely deposited upon the conveyor table 17, the motor 24 can be operated to slow down the high speed rolls 18 and thus apply braking or retarding action to the forward movement of the sheet. While the high speed rolls and low speed rolls have been shown as being alternately arranged, it will be understood that the invention is not limited to this specific arrangement since a pair of high speed rolls and then a pair of low speed rolls may be used or the low speed rolls may be interspersed in various other ways or arrangements with the high speed rolls without departing from the spirit of the invention.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, a conveyor for receiving a newly formed sheet thereupon, including two sets of rolls arranged in the same horizontal plane and adapted to simultaneously engage the sheet and carry it forwardly, the rolls of one set being arranged alternately with the rolls of the other set, and means for positively driving said sets of rolls in the same direction at different speeds.

2. In sheet glass apparatus, a conveyor for receiving a newly formed sheet thereupon, including two sets of rolls arranged in the same horizontal plane and adapted to simultaneously engage the sheet and carry it forwardly, the rolls of one set being arranged alternately with the rolls of the other set, means for positively driving said sets of rolls in the same direction at different speeds, and means associated with one set of rolls for allowing the rolls thereof to synchronize with the rolls of the other set.

3. In sheet glass apparatus, a conveyor for receiving a newly formed sheet thereupon, including two sets of rolls arranged in the same horizontal plane and adapted to simultaneously engage the sheet and carry it forwardly, the rolls of one set being arranged alternately with the rolls of the other set, means for positively driving one set of rolls at a relatively high speed, and means for positively driving the other set of rolls in the same direction at a relatively slower speed.

4. In sheet glass apparatus, a conveyor for receiving a newly formed sheet thereupon, including two sets of rolls arranged in the same horizontal plane and adapted to simultaneously engage the sheet and carry it forwardly, the rolls of one set being arranged alternately with the rolls of the other set, means for positively driving one set of rolls at a relatively high speed, means for positively driving the other set of rolls in the same direction at a relatively slower speed, and means associated with the slow speed rolls for allowing them to synchronize with the speed of the high speed rolls.

5. In sheet glass apparatus, a conveyor for receiving a newly formed sheet thereupon, including two sets of rolls arranged in the same horizontal plane and adapted to simultaneously engage the sheet and carry it forwardly, the rolls of one set being arranged alternately with the rolls of the other set, means for positively driving one set of rolls at a relatively slow speed, means for positively driving the other set of rolls in the same direction at a relatively higher speed, and overrunning clutches associated with the slow speed rolls for allowing the speed of the latter rolls to synchronize with the speed of the high speed rolls.

6. In sheet glass apparatus, a conveyor for receiving a newly formed sheet thereupon, including two sets of rolls arranged in the same horizontal plane and adapted to simultaneously engage the sheet and carry it forwardly, the rolls of one set being arranged alternately with the rolls of the other set, means for positively driving one set of rolls at a relatively slow speed, means for positively driving the other set of rolls in the same direction at a relatively higher speed, and overrunning clutches associated with each of the high speed and low speed rolls.

7. In sheet glass apparatus, a conveyor for receiving a newly formed sheet of glass thereupon at a relatively high rate of speed and delivering it therefrom at a relatively slower speed, including two sets of rolls arranged in the same horizontal plane and adapted to simultaneously support the sheet and carry it forwardly, the rolls of one set being arranged alternately with the rolls of the other set, means for positively driving one set of rolls at a relatively slow speed, means for positively driving the other set of rolls in the same direction at a relatively higher speed, means associated with the low speed rolls to cause said rolls to be driven by the sheet and to synchronize with the speed at which the high speed rolls are positively driven as said sheet is being received upon the conveyor, and means for causing the high speed rolls to be driven by the sheet and to synchronize with the speed at which the low speed rolls are positively driven after said sheet has been received upon said conveyor and the positive drive of the high speed rolls discontinued.

8. In sheet glass apparatus, a conveyor for receiving a newly formed sheet of glass thereupon at a relatively high rate of speed and delivering it therefrom at a relatively slower speed, including two sets of rolls arranged in the same horizontal plane and adapted to simultaneously support the sheet and carry it forwardly, the rolls of one set being arranged alternately with the rolls of the other set, means for positively driving one set of rolls at a relatively slow speed, means for positively driving the other set of rolls in the same direction at a relatively higher speed, an overrunning clutch associated with each low speed roll to cause said rolls to be driven by the sheet and to synchronize with the speed at which the high speed rolls are positively driven as said sheet is being received upon the conveyor, and an overrunning clutch associated with each high speed roll for causing said rolls to be driven by the sheet and to synchronize with the speed at which the low speed rolls are positively driven after said sheet has been received upon said conveyor and the positive drive of the high sped rolls discontinued.

Signed at Toledo, in the county of Lucas and State of Ohio, this 15th day of October 1929.

CARROLL CONE.